(12) United States Patent
Ramasamy et al.

(10) Patent No.: US 12,435,257 B2
(45) Date of Patent: Oct. 7, 2025

(54) DRILLING FLUIDS AND METHODS THEREOF

(71) Applicant: SAUDI ARABIAN OIL COMPANY, Dhahran (SA)

(72) Inventors: Jothibasu Ramasamy, Dhahran (SA); Mohammed K. Arfaj, Dhahran (SA); Mujtaba M. Alsaihati, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 184 days.

(21) Appl. No.: 18/492,469

(22) Filed: Oct. 23, 2023

(65) Prior Publication Data

US 2025/0129282 A1   Apr. 24, 2025

(51) Int. Cl.
  *C09K 8/32* (2006.01)
(52) U.S. Cl.
  CPC ...................................... *C09K 8/32* (2013.01)
(58) Field of Classification Search
  None
  See application file for complete search history.

(56) References Cited

U.S. PATENT DOCUMENTS

| | | |
|---|---|---|
| 7,939,470 B1 | 5/2011 | Wagle et al. |
| 9,127,192 B2 | 9/2015 | Maghrabi et al. |
| 10,767,097 B2 | 9/2020 | Wagle et al. |
| 2013/0303410 A1 | 11/2013 | Wagle et al. |
| 2016/0230067 A1 | 8/2016 | Wagle et al. |
| 2023/0167350 A1 | 6/2023 | Ramasamy et al. |

FOREIGN PATENT DOCUMENTS

| | | |
|---|---|---|
| WO | 2015006101 A1 | 1/2015 |

*Primary Examiner* — Jeffrey D Washville
(74) *Attorney, Agent, or Firm* — Vorys, Sater, Seymour and Pease, LLP

(57) ABSTRACT

Drilling fluids may comprise a base fluid, wherein the base fluid is an invert emulsion comprising an oil and water; one or more additives; and a viscosifier comprising 2-dodecenyl succinic acid. Methods for using a drilling fluid may comprise operating a drill in a wellbore in the presence of a drilling fluid comprising a base fluid, wherein the base fluid is an invert emulsion comprising an oil and water; one or more additives; and a viscosifier comprising 2-dodecenyl succinic acid.

20 Claims, No Drawings

DRILLING FLUIDS AND METHODS THEREOF

FIELD OF THE DISCLOSURE

The present disclosure relates generally to drilling fluids and, more particularly, to invert emulsion drilling fluids.

BACKGROUND OF THE DISCLOSURE

Oil and gas hydrocarbons are naturally occurring in some subterranean formations. During drilling operations, a drilling fluid, which may also be referred to as a drilling mud, is circulated through the wellbore to cool the drill bit, convey rock cuttings to the surface, or to support the wellbore against collapse of the wellbore and against intrusion of fluids from the formation, among other purposes. Invert emersion drilling fluids are drilling fluids comprising an oil in the continuous or external phase and water in the internal phase. These drilling fluids commonly use organophilic clays as viscosifiers to increase the drilling fluid's viscosity. However, organophilic clays are known to degrade under well conditions over time, altering the rheology of the drilling fluid. To remedy this, additional organophilic clay or low gravity solids are mixed with the drilling fluid. Overtreatment with organophilic clay or low gravity solids not only increases the cost of drilling, but also severely impacts other rheological properties of the drilling fluid, including the plastic viscosity and rate of penetration.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, drilling fluids may comprise a base fluid, wherein the base fluid is an invert emulsion comprising an oil and water; one or more additives; and a viscosifier comprising 2-dodecenyl succinic acid.

In another embodiment, methods may comprise operating a drill in a wellbore in the presence of a drilling fluid comprising: a base fluid, wherein the base fluid is an invert emulsion comprising an oil and water; one or more additives; and a viscosifier comprising 2-dodecenyl succinic acid.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

BRIEF DESCRIPTION OF THE DRAWINGS

Not applicable.

DETAILED DESCRIPTION

Embodiments in accordance with the present disclosure generally relate to drilling fluids and, more particularly, to invert emulsion drilling fluids. As mentioned previously, conventional organophilic clay viscosifiers are prone to degradation within oil and gas wells over time. Therefore, there exists a need for drilling fluids comprising viscosifiers that do not degrade under high temperatures and pressures. The present disclosure addresses this need by employing an alternative viscosifier, 2-dodecenyl succinic acid, in invert emulsion drilling fluid formulations. 2-dodecenyl succinic acid, or butanedioic acid, is a chemical viscosifier having a hydrophobic tail and two hydrophilic heads. Without being bound by theory, it is believed that when contacted with the water in the invert emulsion, the hydrophilic heads of 2-dodecenyl succinic acid may surround the individual water droplets, thus stabilizing the emulsion. Resultantly, invert emulsion drilling fluids comprising 2-dodecenyl succinic acid may exhibit improved rheology over conventional invert emulsion drilling fluids.

Non-limiting example drilling fluids may comprise a base fluid, wherein the base fluid is an invert emulsion comprising an oil and water; one or more additives; and a viscosifier comprising 2-dodecenyl succinic acid.

The drilling fluids of the present disclosure may be used in various drilling operations. Such methods may comprise operating a drill in a wellbore in the presence of a drilling fluid comprising a base fluid, wherein the base fluid is an invert emulsion comprising an oil and water; one or more additives; and a viscosifier comprising 2-dodecenyl succinic acid.

To drill a subterranean well, a drill string, including a drill bit and drill collars to weight the drill bit, may be inserted into a predrilled hole and rotated to cause the drill bit to cut into the rock at the bottom of the hole. The drilling operation produces rock fragments. To remove the rock fragments from the bottom of the wellbore, a drilling fluid, such as a drilling fluid of the present disclosure, may be pumped down through the drill string to the drill bit. The drilling fluid cools the drill bit and lifts the rock fragments known as cuttings away from the drill bit. The drilling fluid carries the cuttings upwards as the drilling fluid is recirculated back to the surface. At the surface, the cuttings may be removed from the drilling fluid through a secondary operation, and the drilling fluid may be recirculated back down the drill string to the bottom of the wellbore for collection of further cuttings. It will be appreciated by one skilled in the art that multiple terms familiar to those skilled in the art may be used to describe the same thing. For example, a subterranean well may alternatively be called a borehole or wellbore and usage of a single term is meant to encompass each of the related terms as well.

Drilling fluids include drilling muds, packer fluids, and completion fluids. As used herein, "drilling fluid" means any fluid used to aid the drilling of boreholes into subterranean formations. As used herein, "completion fluids" are solids-free liquid used to "complete" an oil or gas well. Specifically, this fluid is placed in the well to facilitate final operations prior to initiation of production, such as setting screens production liners, downhole valves, or shooting perforations into the producing zone. The fluid is meant to control a well should downhole hardware fail, without damaging the producing formation or completion components. As used here, a "packer fluid" is a fluid that is left in the annular region of a well between tubing and outer casing above a packer. The main functions of a packer fluid are: (1) to provide hydrostatic pressure in order to lower differential pressure across the sealing element, (2) to lower differential pressure on the wellbore and casing to prevent collapse, and (3) to protect metals and elastomers from corrosion. Generically, drilling fluids serve a number of functions with different types specializing in a particular function or functions. In one or more embodiments, a drilling fluid of the present disclosure assists in the removal of cuttings from the bottom of a borehole during drilling operations. The drilling fluid suspends the cuttings and weighted material may transport the cuttings to the borehole surface with the drilling fluid. Additionally, the drilling fluid may absorb gases in the borehole, such as carbon dioxide, hydrogen sulfide, and methane, and transport the gases to the borehole surface for release, sequestration, or burn-off. In further embodiments, the drilling fluid also provides a cooling and lubrication functionality for cooling and lubrication of the bit and drill string utilized in boring operations. The drilling fluid additionally provides buoyancy to the drill string, relieving the tension on the drill string as the length of the borehole increases. Furthermore, the drilling fluid may also control subsurface pressures. Specifically, the drilling fluid may provide hydrostatic pressure in the borehole to provide support to the sidewalls of the borehole and prevent the sidewalls from collapsing and caving in on the drill string. Additionally, the drilling fluid may provide hydrostatic pressure in the bore to prevent fluids in the downhole formations from flowing into the borehole during drilling operations.

As stated previously, the drilling fluid may comprise a base fluid, one or more additives, and a viscosifier comprising 2-dodecenyl succinic acid. The viscosifier must be present in sufficient quantity to gel the drilling fluid, but not at an excessive quantity to impede other properties of the drilling fluid. Specifically, the amount of viscosifier must be controlled as too little viscosifier will not result in gelling while too much will result in excessive gelling. In one or more embodiments, the drilling fluid may comprise about 0.01 wt % to about 1 wt % of the viscosifier, based on the total weight of the drilling fluid. For example, the drilling fluid may have a concentration of the viscosifier of about 0.01 wt % to about 1 wt %, or about 0.01 wt % to about 0.75 wt %, or about 0.01 wt % to about 0.5 wt %, or about 0.01 wt % to about 0.1 wt %, or about 0.1 wt % to about 1 wt %, or about 0.1 wt % to about 0.75 wt %, or about 0.1 wt % to about 0.5 wt %, or about 0.5 wt % to about 1 wt %, or about 0.5 wt % to about 0.75 wt %, or about 0.75 wt % to about 1 wt %.

In one or more embodiments, the base fluid of the drilling fluid composition may be a water-in-oil emulsion known as an invert emulsion. In water-in-oil emulsions or invert emulsions, oil is a continuous phase and water is dispersed in the continuous oil phase by emulsification so that the drilling fluid does not have a distinct water layer. The oil may be a natural or synthetic oil. For example, the oil may comprise diesel, kerosene, fuel oil, crude oil, mineral oil, or any combination thereof. The water in the base fluid may include one or more of deionized, tap, distilled, or fresh waters; natural, brackish, and saturated salt waters; natural, salt dome, hydrocarbon formation, produced, or synthetic brines; filtered or untreated seawaters; mineral waters; and other potable and non-potable waters containing one or more dissolved salts, minerals, or organic materials. A brine may be chosen as the preferred internal phase. This may be done to maintain the osmotic balance between the fluid and the formation. For example, the brine may comprise a salt (e.g., calcium chloride) at a concentration between about 10 wt % and about 45 wt % (or about 20 wt % to about 45 wt %, or about 30 wt % to about 45 wt %, or about 40 wt % to about 45 wt %) based on the total weight of the brine as the internal phase.

In one or more embodiments, the base fluid may comprise an oil-to-water ratio by volume of 50:50 to about 95:05. For example, the oil-to-water ratio by volume of the base fluid may be about 50:50 to about 80:20, or about 50:50 to about 75:25, or about 55:45 to about 85:15, or about 60:40 to about 85:15, or about 70:30 to about 85:15, or about 60:40 to about 80:20, or about 65:35 to about 75:25.

The drilling fluid may, for example, have a weight percent of base fluid of from about 1 wt % to about 99 wt %, or about 20 wt % to about 80 wt %, or about 30 wt % to about 70 wt %, or about 40 wt % to about 60 wt %, or about 45 wt % to about 55 wt % based on the total weight of the drilling fluid. In one or more embodiments, the drilling fluid comprises an amount of base fluid which is dependent upon application. For example, the amount of oil or the oil-to-water ratio depends of the mud weight.

The viscosifier may include other non-organophilic clay components in addition to 2-dodecenyl succinic acid. The additional components may be used to impart non-Newtonian fluid rheology to the drilling fluid and to facilitate lifting and conveying rock cuttings to the surface of the wellbore. Examples of viscosifiers may include, but are not limited to, xanthan gum, polyacrylamide, the like, and any combination thereof.

The drilling fluid may comprise one or more additives to enhance at least one characteristic of the drilling fluid. Examples of suitable additives include, but are not limited to, a weighting material, an emulsifier, a fluid-loss control additive, an alkaline compound, the like, and any combination thereof.

In further embodiments, additives in the drilling fluid may include a weighting material. The weighting material may have a specific gravity suited for raising the drilling fluid composition density. In one or more embodiments, the weighting material may be a particulate solid having a specific gravity sufficient to increase the density of the drilling fluid by a certain amount without adding excessive weighting material such that the drilling fluid cannot be circulated through the wellbore. The weighting material may, for example, have a specific gravity of about 2 g/cm$^3$ to about 6 g/cm$^3$, or about 2 g/cm$^3$ to about 4 g/cm$^3$, or about 4 g/cm$^3$ to about 6 g/cm$^3$. Examples of weighting materials include, but are not limited to, barite, calcium carbonate, siderite, ilmenite, the like, and any combination thereof. Some example drilling fluids may include barite as the solid.

In one or more embodiments, additives in the drilling fluid may include an emulsifier. For example, the drilling fluid may comprise about 7 $lb_m$/bbl to about 25 $lb_m$/bbl of emulsifier, or about 8 $lb_m$/bbl to about 20 $lb_m$/bbl of emulsifier, or about 9 $lb_m$/bbl to about 15 $lb_m$/bbl of emulsifier. In one or more embodiments, the emulsifier may be an invert emulsifier and oil-wetting agent for synthetic-based drilling fluid systems such as carboxylic acid-terminated polyamide. Commercially available emulsifiers include VERSAMUL™ from MI SWACO and LE SUPERMUL™ from Halliburton Energy Services, Inc.

In one or more embodiments, additives in the drilling fluid may include a fluid-loss control additive. The fluid-loss control additive may be added to the drilling fluid to reduce the amount of filtrate lost from the oil-based drilling fluid into a subterranean formation. Examples of fluid-loss control additives include lignite, bentonite, manufactured polymers, thinners, deflocculants, or any combination thereof. The drilling fluid may, for example, comprise about 1 $lb_m$/bbl to about 10 $lb_m$/bbl of fluid-loss control additive, or about 1 $lb_m$/bbl to about 6 $lb_m$/bbl of fluid-loss control additive, or about 1.5 $lb_m$/bbl to about 8 $lb_m$/bbl of fluid-loss control additive, or about 1.5 lb$_m$/bbl to about 2.5 lb$_m$/bbl of fluid-loss control additive. Commercially available example fluid-loss control additives include VERSACOAT™ VERSATROL™, VERSALIG™, ECOTROL™ RD, ONETROL™ HT, EMI 789, and NOVATECH™ F, all from MI SWACO, and DURATONE® HT which is from Halliburton Energy Services, Inc. In one or more embodiments, the fluid-loss control additive may be a methylstyrene/acrylate copolymer filter control agent such as ADAPTA® which is commercially available from Halliburton Energy Services, Inc.

In one or more embodiments, additives in the drilling fluid may include one or more alkaline compounds for pH adjustment, which may include lime (calcium hydroxide or calcium oxide), soda ash (sodium carbonate), sodium hydroxide, potassium hydroxide, other strong bases, or any combination thereof. It is noted that conjugate bases to acids with a pK$_a$ of more than about 13 are considered strong bases. The pH may be maintained within a range in order to minimize corrosion caused by the drilling fluid on steel tubulars, tanks, pumps, and other equipment contacting the drilling fluid. Additionally, the alkaline compounds may react with gases, such as carbon dioxide or hydrogen sulfide for example, encountered by the drilling fluid during drilling operations to prevent the gases from hydrolyzing one or more components of the drilling fluid. Some example drilling fluids may include about 0.1 lb$_m$/bbl to about 10 lb$_m$/bbl of alkaline compound, or about 0.5 lb$_m$/bbl to about 5 lb$_m$/bbl of alkaline compound, or about 1 lb$_m$/bbl to about 2 lb$_m$/bbl of alkaline compound.

One skilled in the art can appreciate that the drilling fluid may include one or more additional modifiers to alter a characteristic of the drilling fluid. Examples of additional modifiers may include, but are not limited to, pH adjusters, electrolytes, glycols, glycerols, dispersion aids, corrosion inhibitors, defoamers, the like, and any combination thereof.

In one or more embodiments, the drilling fluid may be substantially free of organophilic clay. For purposes of this disclosure, substantially free of organophilic clay means the drilling fluid comprises less than about 0.01 wt % organophilic clay, or less than about 0.001 wt % of organophilic clay, or less than about 0.0001 wt % of organophilic clay.

The drilling fluid may, for example, have a density of about 5 lb$_m$/gal to about 15 lb$_m$/gal, or about 5 lb$_m$/gal to about 12.5 lb$_m$/gal, or about 5 lb$_m$/gal to about 10 lb$_m$/gal, or about 5 lb$_m$/gal to about 7.5 lb$_m$/gal, or about 7.5 lb$_m$/gal to about 15 lb$_m$/gal, or about 7.5 lb$_m$/gal to about 12.5 lb$_m$/gal, or about 7.5 lb$_m$/gal to about 10 lb$_m$/gal, or about 10 lb$_m$/gal to about 15 lb$_m$/gal, or about 10 lb$_m$/gal to about 12.5 lb$_m$/gal, or about 12.5 lb$_m$/gal to about 15 lb$_m$/gal.

During circulation of the drilling fluid through the wellbore, the drilling fluid may accumulate cuttings and other solids. Additionally, the drilling fluid itself may have solids dispersed throughout, such as weighting material. During circulation of the drilling fluid, the solids are continuously mixed and suspended within the drilling fluid. However, when circulation of the drilling fluid is interrupted or terminated, the solids may settle or separate from the bulk of the drilling fluid based on the rheology of the drilling fluid. Settling of the cuttings and other solids is undesirable because they would accumulate at the bottom of the wellbore and potentially prevent the drill from rotating or completely block the flow path of the drilling fluid upon resumption of drilling activities.

The viscosifier may also adjust the rheology and viscosity of the drilling fluid when combined with the base fluid and one or more additives. The addition of the viscosifier may result in an increased yield point and gel strength. As previously indicated, the increased viscosity, yield point, and gel strength assists in maintaining suspension of solids and cuttings within the drilling fluid composition both during circulation and when circulation is interrupted.

The viscosity of the drilling fluid may be measured using a standard oilfield viscometer according to test methods provided in the American Petroleum Institute (API) Recommended Practice for Field Testing Oil-Based Drilling Fluids (RP 13B-2/ISO 10414-1:2002) published August 2014 and incorporated by reference into this disclosure in its entirety. Drilling fluid is placed in an annular space between two concentric cylinders. The outer cylinder is rotated at a constant rotational velocity which produces a torque on the inner cylinder (or spindle) which is measured. The viscosity is reported as shear stress in units of pounds of force per 100 square feet (lb$_f$/100 ft$^2$). The viscometer, which may be a Fann 35 from FANN Instruments, may be used to measure the shear rate of the drilling fluid compositions.

The gel strength refers to the shear stress of the drilling fluid measured at a low shear rate following a defined period of time during which the drilling fluid is maintained in a static state. The shear stress at low shear rate may be measured using a standard oilfield viscometer operated at low rpms, such as about 3 rpm, according to the test methods described in API RP 13B-2. To measure the gel strength, the drilling fluid is first stirred by contacting the drilling fluid with the spindle of the viscometer and operating the viscometer at 600 rotations per minute (rpm) for 10 seconds. The viscometer is then turned off for a period of time (time period). For a 10 second gel strength, the time period is 10 seconds, and for a 10 minute gel strength, the time period is 10 minutes. Other time periods for measuring gel strength are contemplated. During the time period, the drilling fluid comes to rest in a static state. Upon expiration of the time period, the viscometer is turned back on at a low speed, such as 3 rpm, to generate a low shear rate. The viscometer reading is then taken. The gel strength is reported in units of pounds of force per 100 square feet (lb$_f$/100 ft$^2$).

The 10 second gel strength provides an indication of the ability of the drilling fluid to gel immediately upon termination of drill rotation and circulation of the drilling fluid composition. Quick or near instantaneous gelling of the drilling fluid composition upon termination of circulation helps ensure solids do not settle before gelling. A sufficiently high 10 second gel strength indicates the drilling fluid composition formed a robust gel quickly after removal of agitation. The drilling fluid may, for example, have a 10 second gel strength of about 1 lb$_f$/100 ft$^2$ to about 5 lb$_f$/100 ft$^2$, or about 1 lb$_f$/100 ft$^2$ to about 4 lb$_f$/100 ft$^2$, or about 1 lb$_f$/100 ft$^2$ to about 3 lb$_f$/100 ft$^2$, or about 1 lb$_f$/100 ft$^2$ to about 2 lb$_f$/100 ft$^2$, or about 2 lb$_f$/100 ft$^2$ to about 5 lb$_f$/100 ft$^2$, or about 2 lb$_f$/100 ft$^2$ to about 4 lb$_f$/100 ft$^2$, or about 2 lb$_f$/100 ft$^2$ to about 3 lb$_f$/100 ft$^2$, or about 3 lb$_f$/100 ft$^2$ to about 5 lb$_f$/100 ft$^2$, or about 4 lb$_f$/100 ft$^2$ to about 5 lb$_f$/100 ft$^2$.

Similarly, the 10 minute gel strength provides an indication of the ability of the drilling fluid to sustain a gelled configuration for a sustained period after termination of drill rotation and circulation of the drilling fluid. A sufficiently high 10 minute gel strength indicates the drilling fluid formed a robust gel which was maintained during periods without agitation. The drilling fluid may, for example, have a 10 minute gel strength of about 1 lb$_f$/100 ft$^2$ to about 10 lb$_f$/100 ft$^2$, or about 1 lb$_f$/100 ft$^2$ to about 7.5 lb$_f$/100 ft$^2$, or about 1 lb$_f$/100 ft$^2$ to about 5 lb$_f$/100 ft$^2$, or about 1 lb$_f$/100 ft$^2$ to about 2.5 lb$_f$/100 ft$^2$, or about 2.5 lb$_f$/100 ft$^2$ to about 10 lb$_f$/100 ft$^2$, or about 2.5 lb$_f$/100 ft$^2$ to about 7.5 lb$_f$/100 ft$^2$, or about 2.5 lb$_f$/100 ft$^2$ to about 5 lb$_f$/100 ft$^2$, or about 5 lb$_f$/100 ft$^2$ to about 10 lb$_f$/100 ft$^2$, or about 5 lb$_f$/100 ft$^2$ to about 7.5 lb$_f$/100 ft$^2$, or about 7.5 lb$_f$/100 ft$^2$ to about 10 lb$_f$/100 ft$^2$.

The drilling fluid behaves as a rigid body at low stress, but flows as a viscous fluid at a higher shear stress. The rheology of the drilling fluid may be modeled based on Bingham plastic flow behavior. Additionally, the rheological behavior of the drilling fluid may be determined by measuring the shear stress on the drilling fluid at different shear rates, which may be accomplished by measuring the shear stress, the shear rate, or both on the drilling fluid using a viscometer (FANN 35 rheometer) at 3 rpm, 6 rpm, 300 rpm, and 600 rpm. Rheology measurements were done at 120° F. (48.9° C.).

The rheology of the drilling fluid may be evaluated from the plastic viscosity (PV) and yield point (YP), which are parameters from the Bingham plastic rheology model. The PV is related to the resistance of the drilling fluid to flow due to mechanical interaction between the solids of the drilling fluid and represents the viscosity of the drilling fluid extrapolated to infinite shear rate. The PV reflects the type and concentration of the solids in the drilling fluid, and a lesser PV is preferred. The PV of the drilling fluid may be estimated by measuring the shear rate of the drilling fluid using the viscometer at spindle speeds of 300 rpm and 600 rpm and subtracting the 300 rpm measurement from the 600 rpm measurement according to Equation 1. The PV is provided in this disclosure in units of centipoise (cP).

$$PV = (600 \text{ } rpm \text{ reading}) = (300 \text{ } rpm \text{ reading}) \quad \text{Equation 1}$$

The drilling fluid may, for example, have a PV of about 15 cp to about 20 cp, or about 15 cp to about 19 cp, or about 15 cp to about 18 cp, or about 15 cp to about 17 cp, or about 15 cp to about 16 cp, or about 16 cp to about 20 cp, or about 16 cp to about 19 cp, or about 16 cp to about 18 cp, or about 16 cp to about 17 cp, or about 17 cp to about 20 cp, or about 17 cp to about 19 cp, or about 17 cp to about 18 cp, or about 18 cp to about 20 cp, or about 18 cp to about 19 cp, or about 19 cp to about 20 cp.

The YP represents the shear stress below which the drilling fluid behaves as a rigid body and above which the drilling fluid flows as a viscous fluid. Specifically, the YP represents the amount of stress required to move the drilling fluid from a static condition. The YP is expressed as a force per area, such as pounds of force per one hundred square feet (lb$_f$/100 ft$^2$). YP provides an indication of the carrying capacity of the drilling fluid for rock cuttings through the annulus, which provides an indication of the hole-cleaning ability of the drilling fluid. Additionally, frictional pressure loss is directly related to the YP. For higher YPs, there will be higher pressure loss while the drilling fluid is being circulated. A drilling fluid having a YP of equal to or greater than 15 lb$_f$/100 ft$^2$ is considered acceptable for drilling and a YP of equal to or greater than 30 lb$_f$/100 ft$^2$ is considered acceptable for utilization as a packer fluid. The YP is determined by extrapolating the Bingham plastic rheology model to a shear rate of zero. The YP may be estimated from the PV from Equation 1 by subtracting the PV obtained from Equation 1 from the shear rate of the drilling fluid measured at 300 rpm according to Equation 2.

$$YP = (300 \text{ } rpm \text{ reading}) - PV \quad \text{Equation 2}$$

The drilling fluid may, for example, have a YP of about 5 lb$_f$/100 ft$^2$ to about 10 lb$_f$/100 ft$^2$, or about 5 lb$_f$/100 ft$^2$ to about 7.5 lb$_f$/100 ft$^2$, or about 7.5 lb$_f$/100 ft$^2$ to about 10 lb$_f$/100 ft$^2$.

An electrical stability (ES) test may be used to determine the emulsion and oil-wetting of the drilling fluid. The ES test may be performed by inserting an ES probe into a sample of the drilling fluid at a temperature of 120° F. and applying an increasing voltage across an electrode gap in the probe. The maximum voltage that the drilling fluid will sustain across the gap before conducting a current is determined to be the ES. The drilling fluid may, for example, have an ES of about 100 V to about 200 V, or about 100 V to about 175 V, or about 100 V to about 150 V, or about 150 V to about 200 V, or about 150 V to about 175 V.

The spurt loss is the instantaneous volume (spurt) of drilling fluid that passes through a filter medium prior to the deposition of a competent and controlling filter cake. For example, the drilling fluid may have a spurt loss of about 25 mL to about 35 mL, or about 25 mL to about 33 mL, or about 25 mL to about 30 mL, or about 30 mL to about 35 mL, or about 30 mL to about 33 mL, or about 33 mL to about 35 mL. Similarly, the filtrate volume is the volume of drilling fluid filtrate that is measured after 30 minutes in an API 13B-2 static filtration test. For example, the drilling fluid may have a filtrate volume of about 10 mL to about 20 mL, or about 10 mL to about 18 mL, or about 10 mL to about 16 mL, or about 16 mL to about 20 mL, or about 16 mL to about 18 mL.

Embodiments disclosed herein include:

A. A drilling fluid including a base fluid, wherein the base fluid is an invert emulsion comprising an oil and water; one or more additives; and a viscosifier comprising 2-dodecenyl succinic acid.

B. A method including operating a drill in a wellbore in the presence of a drilling fluid comprising: a base fluid, wherein the base fluid is an invert emulsion comprising an oil and water; one or more additives; and a viscosifier comprising 2-dodecenyl succinic acid.

Each of embodiments A and B may have one or more of the following additional elements in any combination:

Element 1: wherein the oil comprises diesel, kerosene, fuel oil, crude oil, mineral oil, or any combination thereof.

Element 2: wherein the base fluid has an oil-to-water ratio of about 50:50 to about 95:05 by volume of the base fluid.

Element 3: wherein a concentration of the viscosifier is about 0.01 wt % to about 1 wt % based on the total weight of the drilling fluid.

Element 4: wherein the one or more additives comprise an emulsifier, a weighting material, a fluid-loss control additive, an alkaline compound, or any combination thereof.

Element 5: wherein the drilling fluid is substantially free of organophilic clay.

Element 6: wherein a density of the drilling fluid is about 5 lb$_m$/gal to about 15 lb$_m$/gal.

Element 7: wherein a plastic viscosity (PV) of the drilling fluid is about 15 cp to about 20 cp.

Element 8: wherein a yield point (YP) of the drilling fluid is about 5 lb$_f$/100 ft$^2$ to about 10 lb$_f$/100 ft$^2$.

Element 9: wherein the drilling fluid has a 10 second gel strength of about 1 lb$_f$/100 ft$^2$ to about 5 lb$_f$/100 ft$^2$.

Element 10: wherein the drilling fluid has a 10 minute gel strength of about 1 lb$_f$/100 ft$^2$ to about 10 lb$_f$/100 ft$^2$.

By way of non-limiting examples, exemplary combinations applicable to A and B include: 1 and 2; 1 and 3; 1 and 4; 1 and 5; 1 and 6; 1 and 7; 1 and 8; 1 and 9; 1 and 10; 2 and 3; 2 and 4; 2 and 5; 2 and 6; 2 and 7; 2 and 8; 2 and 9; 2 and 10; 3 and 4; 3 and 5; 3 and 6; 3 and 7; 3 and 8; 3 and 9; 3 and 10; 4 and 5; 4 and 6; 4 and 7; 4 and 8; 4 and 9; 4 and 10; 5 and 6; 5 and 7; 5 and 8; 5 and 9; 5 and 10; 6 and 7; 6 and 8; 6 and 9; 6 and 10; 7 and 8; 7 and 9; 7 and 10; 8 and 9; 8 and 10; 9 and 10; 1-3; and 2-4; and 3-5.

The present disclosure is further directed to the following non-limiting causes:

Clause 1. A drilling fluid comprising:
a base fluid, wherein the base fluid is an invert emulsion comprising an oil and water; one or more additives; and
a viscosifier comprising 2-dodecenyl succinic acid.

Clause 2. The drilling fluid of clause 1, wherein the oil comprises diesel, kerosene, fuel oil, crude oil, mineral oil, or any combination thereof.

Clause 3. The drilling fluid of clause 1 or clause 2, wherein the base fluid has an oil-to-water ratio of about 50:50 to about 95:05 by volume of the base fluid.

Clause 4. The drilling fluid of any one of clauses 1-3, wherein a concentration of the viscosifier is about 0.01 wt % to about 1 wt % based on the total weight of the drilling fluid.

Clause 5. The drilling fluid of any one of clauses 1-4, wherein the one or more additives comprise an emulsifier, a weighting material, a fluid-loss control additive, an alkaline compound, or any combination thereof.

Clause 6. The drilling fluid of any one of clauses 1-5, wherein the drilling fluid is substantially free of organophilic clay.

Clause 7. The drilling fluid of any one of clauses 1-6, wherein a density of the drilling fluid is about 5 $lb_m$/gal to about 15 $lb_m$/gal.

Clause 8. The drilling fluid of any one of clauses 1-7, wherein a plastic viscosity (PV) of the drilling fluid is about 15 cp to about 20 cp.

Clause 9. The drilling fluid of any one of clauses 1-8, wherein a yield point (YP) of the drilling fluid is about 5 $lb_f$/100 ft$^2$ to about 10 $lb_f$/100 ft$^2$.

Clause 10. The drilling fluid of any one of clauses 1-9, wherein the drilling fluid has a 10 second gel strength of about 1 $lb_f$/100 ft$^2$ to about 5 $lb_f$/100 ft$^2$.

Clause 11. The drilling fluid of any one of clauses 1-10, wherein the drilling fluid has a 10 minute gel strength of about 1 $lb_f$/100 ft$^2$ to about 10 $lb_f$/100 ft$^2$.

Clause 12. A method comprising:
operating a drill in a wellbore in the presence of a drilling fluid comprising:
a base fluid, wherein the base fluid is an invert emulsion comprising an oil and water;
one or more additives; and
a viscosifier comprising 2-dodecenyl succinic acid.

Clause 13. The method of clause 12, wherein the oil comprises diesel, kerosene, fuel oil, crude oil, mineral oil, or any combination thereof.

Clause 14. The method of clause 12 or clause 13, wherein the base fluid has an oil-to-water ratio of about 50:50 to about 95:05 by volume of the base fluid.

Clause 15. The method of any one of clauses 12-14, wherein a concentration of the viscosifier is about 0.01 wt % to about 1 wt % based on the total weight of the drilling fluid.

Clause 16. The method of any one of clauses 12-15, wherein the one or more additives comprise an emulsifier, a weighting material, a fluid-loss control additive, an alkaline compound, or any combination thereof.

Clause 17. The method of any one of clauses 12-16, wherein the drilling fluid is substantially free of organophilic clay.

Clause 18. The method of any one of clauses 12-17, wherein a density of the drilling fluid is about 5 $lb_m$/gal to about 15 $lb_m$/gal.

Clause 19. The method of any one of clauses 12-18, wherein a PV of the drilling fluid is about 15 cp to about 20 cp.

Clause 20. The method of any one of clauses 12-19, wherein a YP of the drilling fluid is about 5 $lb_f$/100 ft$^2$ to about 10 $lb_f$/100 ft$^2$.

EXAMPLES

Comparative and experimental drilling fluids were prepared with organophilic clay or 2-dodecenyl succinic acid, respectively, as viscosifiers. The drilling fluid formulations contained 218 mL of diesel, 6 mL of VERSAMUL™, 4 mL of VERSACOAT™, 6 g of lime, 6 g of DURATONE™, 85 mL of 41.8 wt % $CaCl_2$) brine, 161 g of barite, and 2 g of either viscosifier. Each drilling fluid was hot-rolled at 300° F. and 500 psi for 16 hours. Table 2 shows the rheological properties of each drilling fluid following the hot-rolling.

TABLE 1

| Property | Comparative Drilling Fluid | Experimental Drilling Fluid |
|---|---|---|
| Density ($lb_m$/gal) | 10.6 | 10.6 |
| PV (cp) | 19 | 17.6 |
| YP ($lb_f$/100 ft$^2$) | 1 | 7 |
| 10 sec Gel Strength ($lb_f$/100 ft$^2$) | 1 | 2.6 |
| 10 min Gel Strength ($lb_f$/100 ft$^2$) | 3 | 5.3 |
| Electrical Stability (V) | 74 | 150 |
| Spurt Loss (mL) | 4 | 33 |
| Filtrate Volume (mL) | 6 | 16 |
| Sag factor | 0.64 | 0.53 |

The comparative drilling fluid prepared with the organophilic clay viscosifier showed poor rheology with low YP, gel strength, electrical stability, spurt loss, and filtrate volume compared to the experimental drilling fluid. The experimental drilling fluid also experienced less sagging of the barite weighting material.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains," "containing," "includes," "including," "comprises," and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

The invention claimed is:

1. A drilling fluid comprising:
a base fluid, wherein the base fluid is an invert emulsion comprising an oil and water;
one or more additives; and
a viscosifier comprising 2-dodecenyl succinic acid.

2. The drilling fluid of claim 1, wherein the oil comprises diesel, kerosene, fuel oil, crude oil, mineral oil, or any combination thereof.

3. The drilling fluid of claim 1, wherein the base fluid has an oil-to-water ratio of about 50:50 to about 95:05 by volume of the base fluid.

4. The drilling fluid of claim 1, wherein a concentration of the viscosifier is about 0.01 wt % to about 1 wt % based on the total weight of the drilling fluid.

5. The drilling fluid of claim 1, wherein the one or more additives comprise an emulsifier, a weighting material, a fluid-loss control additive, an alkaline compound, or any combination thereof.

6. The drilling fluid of claim 1, wherein the drilling fluid is substantially free of organophilic clay.

7. The drilling fluid of claim 1, wherein a density of the drilling fluid is about 5 $lb_m$/100 to about 15 $lb_m$/gal.

8. The drilling fluid of claim 1, wherein a plastic viscosity (PV) of the drilling fluid is about 15 cp to about 20 cp.

9. The drilling fluid of claim 1, wherein a yield point (YP) of the drilling fluid is about 5 $lb_f$/100 $ft^2$ to about 10 $lb_f$/100 $ft^2$.

10. The drilling fluid of claim 1, wherein the drilling fluid has a 10 second gel strength of about 1 $lb_f$/100 $ft^2$ to about 5 $lb_f$/100 $ft^2$.

11. The drilling fluid of claim 1, wherein the drilling fluid has a 10 minute gel strength of about 1 $lb_f$/100 $ft^2$ to about 10 $lb_f$/100 $ft^2$.

12. A method comprising:
operating a drill in a wellbore in the presence of a drilling fluid comprising:
a base fluid, wherein the base fluid is an invert emulsion comprising an oil and water;
one or more additives; and
a viscosifier comprising 2-dodecenyl succinic acid.

13. The method of claim 12, wherein the oil comprises diesel, kerosene, fuel oil, crude oil, mineral oil, or any combination thereof.

14. The method of claim 12, wherein the base fluid has an oil-to-water ratio of about 50:50 to about 95:05 by volume of the base fluid.

15. The method of claim 12, wherein a concentration of the viscosifier is about 0.01 wt % to about 1 wt % based on the total weight of the drilling fluid.

16. The method of claim 12, wherein the one or more additives comprise an emulsifier, a weighting material, a fluid-loss control additive, an alkaline compound, or any combination thereof.

17. The method of claim 12, wherein the drilling fluid is substantially free of organophilic clay.

18. The method of claim 12, wherein a density of the drilling fluid is about 5 $lb_m$/gal to about 15 $lb_m$/gal.

19. The method of claim 12, wherein a PV of the drilling fluid is about 15 cp to about 20 cp.

20. The method of claim 12, wherein a YP of the drilling fluid is about 5 lb$_f$/100 ft$^2$ to about 10 lb$_f$/100 ft$^2$.

\* \* \* \* \*